June 21, 1927.
L. C. IRWIN
1,633,380
COMPENSATING MEANS FOR RECORDING AND INDICATING INSTRUMENTS
Filed June 20, 1925
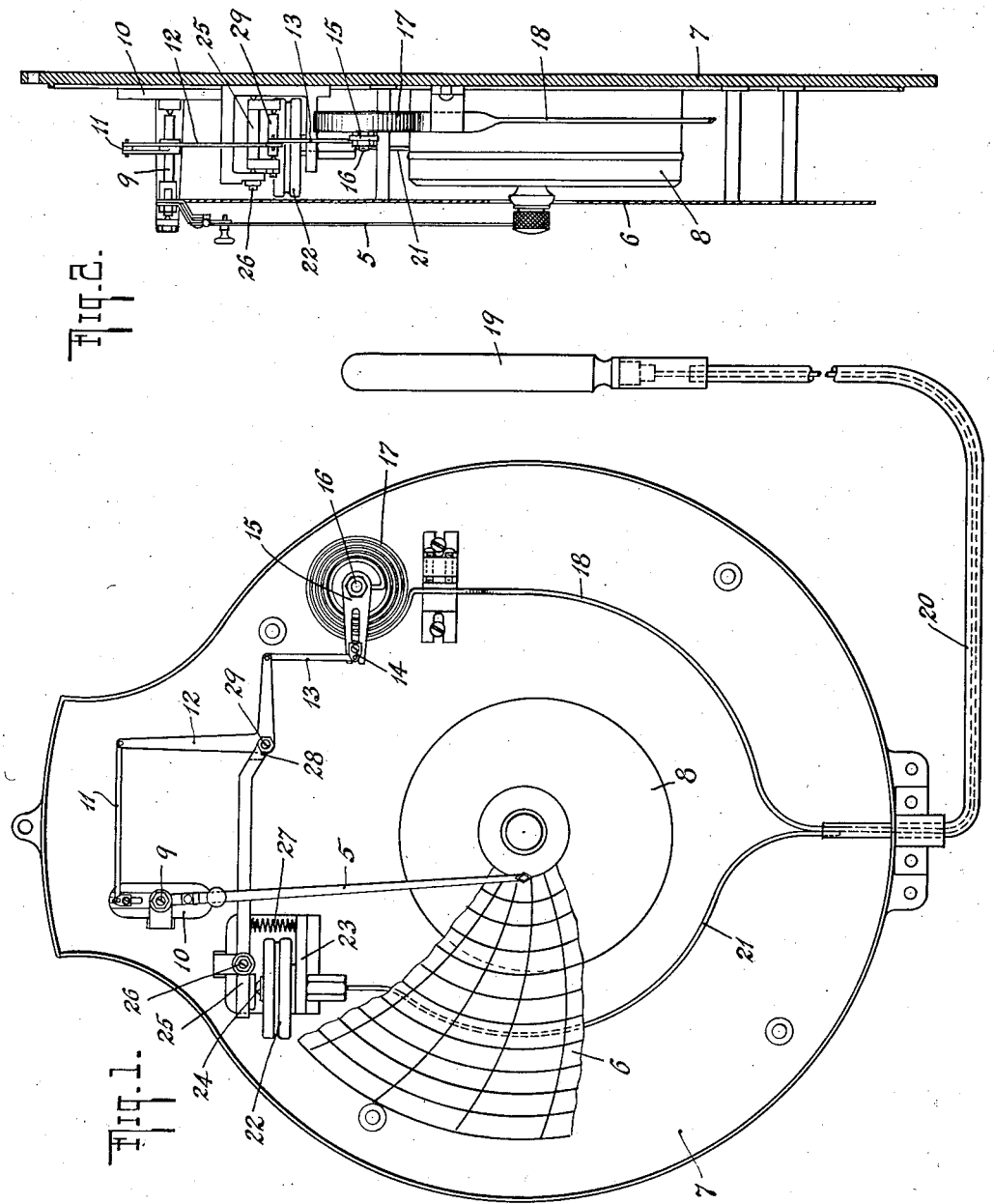
WITNESS
INVENTOR
LAWRENCE C. IRWIN
BY
ATTORNEYS Patented June 21, 1927.

1,633,380

UNITED STATES PATENT OFFICE.

LAWRENCE C. IRWIN, OF BROOKLYN, NEW YORK, ASSIGNOR TO CHARLES J. TAGLIABUE MFG. CO., OF BROOKLYN, NEW YORK, A CORPORATION OF NEW YORK.

COMPENSATING MEANS FOR RECORDING AND INDICATING INSTRUMENTS.

Application filed June 20, 1925. Serial No. 38,484.

My invention relates to recording and indicating instruments and more particularly to that type in which a thermo-sensitive element connected with a thermo-sensitive bulb is the actuating medium whereby the recording and indicating instrumentalities are controlled. In such instruments, the bulb is connected with the thermo-sensitive element by means of a capillary tube and ofttimes is located at a considerable distance from the instrument itself. The capillary tube intermediate of the points of location of the bulb and the instrument is therefore susceptible to temperatures effective upon the fluid in such capillary tube and consequently tending to affect the accuracy of the aforesaid thermo-sensitive element and of the recording and indicating instrumentalities. The object of the present invention is to provide a novel and simple compensating means whereby expansion or contraction of the fluid in the capillary tube resulting from the effects of intermediate or extraneous temperatures are neutralized or compensated for so that the instrument will record and indicate accurately only the temperatures existing at and effective upon the thermo-sensitive bulb. Other more specific objects will appear from the description hereinafter and the features of novelty will be pointed out in the claims.

In the accompanying drawings, which illustrate an example of my invention and of its application without defining its limits, Fig. 1 is a front elevation of an instrument equipped with the novel arrangement, and Fig. 2 is a side elevation thereof partly in section.

In the illustrated example, the recording and indicating element is shown in the form of a pen-arm 5 effective upon a chart 6 which is mounted in a suitable casing 7 and is rotated at a predetermined speed by means of conventional clock mechanism 8. The pen-arm, which is intended to be representative of equivalent devices, is pivoted at 9 upon a suitable bracket 10 and is connected by means of a link 11 with a bell crank lever 12. The latter in turn is connected by means of a link 13 with the thermo-sensitive element whereby the recording and indicating instrumentalities are actuated in accordance with temperature changes, as will be hereinafter more fully described. In the present case, the link 13 is connected at 14 with an arm 15 which in turn is connected at 16 to the inner end of a Bourdon spring 17 constituting the thermo-sensitive element in the illustrated example of the invention. The Bourdon spring 17 is connected by means of a capillary tube 18 with a thermo-sensitive bulb 19 which in the operative condition of the instrument is located at a point at which it is desired to record and indicate the temperatures. The compensating means comprising a protecting tube 20 which extends between the instrument casing 7 and the bulb 19 and surrounds and encloses that part of the capillary tube 18 which is located between the bulb 19 and the instrument; in the space between the exterior surface of the capillary tube 18 and the interior surface of the protecting tube 20, the latter is filled with a suitable fluid, preferably gaseous, which is susceptible to expansion and contraction by temperature changes effective thereon. At the bulb end the tube 20 is sealed in any suitable manner to prevent the escape of the gas and at its other end, the gas-filled space of the tube 20 is connected, by means of a second capillary tube 21, with an expanding and contracting element illustrated in the form of a capsular spring 22 mounted in fixed position upon a bracket 23 in the casing 7. The capillary tube 18 is of lesser external diameter than the internal diameter of the protecting tube 20 whereby an annular chamber is provided interiorly of the latter and exteriorly of that part of the capillary tube 18 which is located within the protecting tube 20, this annular chamber being filled with the aforesaid gas. With this arrangement that part of the capilliary tube 18 which extends between the bulb 19 and the instrument thus passes through said gas and is completely surrounded thereby within said tube 20. It will be understood that the ends of the tube 20 and the connections between the latter and the capillary tubes are made air or gas tight in any suitable manner. In the illustrated example the capsular spring is provided with a projection 24 located in engagement with one end of a lever 25 pivoted at 26 upon the aforesaid bracket 23, the end of the lever 25 being maintained in engagement with the projection 24 of the capsular spring 22 by means of a spring 27 or its equivalent. At its upper free end, the lever 25 is forked as indicated at 28 for the reception of a pivot member 29 by which the bell crank lever 12 is carried; with the arrangement set forth, the bell crank lever 12 is thus pivotally mounted upon the lever 25 in such a manner that the pivot 29 constitutes what may be termed a floating pivot. It will be understood that the arrangement, construction and operation of the recording instrumentalities or their equivalent, per se, form no part of the present invention and accordingly may be of different character from that illustrated.

In operation, the temperature changes effective upon the bulb 19 will expand or contract the fluid therein and will correspondingly cause the thermo-sensitive element or specifically the Bourdon spring 17 to be accordingly actuated; that is, as the fluid expands, the Bourdon spring will be uncoiled and thereby will move the arm 15 downwardly and exert a pull upon the link 13. This pull will be transmitted to the bell crank lever 12 and by it to the link 11 and will consequently actuate the recording or indicating device or specifically will move the pen arm 5 relatively to the chart 6. At the same time, any temperature effective upon the protecting tube 20 at points between the bulb and the instrument will cause the gas which surrounds the capillary tube 18 in said tube 20 to expand and correspondingly expand the capsular spring 22. This will pivotally actuate the lever 25 in such a manner that the pivot 29 will be moved downwardly a distance sufficient to neutralize the effect of these intermediate temperatures upon the recording and indicating device or specifically upon the pen arm 5. In other words, whatever the effect of the temperature upon the gas in the protecting tube 20 may be, this effect will be transmitted by the capsular spring 22 or its equivalent to the lever 25, and cause the lever 25 to be actuated to position the pivot 29 in such a manner that the effects of such intermediate temperature will be compensated for. As a result of this, only the temperature effective upon the bulb 19 and which it is desired to indicate or record will be effective upon the indicating or recording device or specifically upon the pen arm 5. The instrument with which the improved and more compensating means may be combined is accordingly extremely accurate and may be located at any distance from the point at which the bulb or the equivalent is positioned without interfering with such accuracy.

Various changes in the specific form shown and described may be made within the scope of the claims without departing from the spirit of my invention.

I claim:

1. In a distance-type thermometer, a bulb, a pressure-sensitive device, an indicator adapted to be actuated by said device, a capillary tube connecting said bulb with said device, a protecting tube enclosing at least a part of the capillary tube and spaced therefrom to provide an annular gas-containing chamber, a second pressure-sensitive device connected to said chamber, and compensating means operated by the second pressure-sensitive device for varying the movements of said indicator.

2. In a distance-type thermometer, a bulb, a Bourdon tube, a capillary tube connecting said bulb with said Bourdon tube, an indicator, connections between the Bourdon tube and the indicator including a lever, a protecting tube enclosing at least a part of the capillary tube and spaced therefrom to provide an annular gas-containing chamber, a pivoted arm forming the fulcrum of said lever, a pressure-responsive device adapted to actuate said arm, and a second capillary tube connecting said pressure-responsive device with said chamber.

In testimony whereof I have hereunto set my hand.

LAWRENCE C. IRWIN.